US012355620B2

(12) United States Patent
Ning et al.

(10) Patent No.: US 12,355,620 B2
(45) Date of Patent: Jul. 8, 2025

(54) MODEL PROCESSING METHOD FOR CLOUD SERVICE SYSTEM AND CLOUD SERVICE SYSTEM

(71) Applicant: HUAWEI TECHNOLOGIES CO., LTD., Guangdong (CN)

(72) Inventors: Weikang Ning, Shenzhen (CN); Xuewen Yang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/152,970

(22) Filed: Jan. 11, 2023

(65) Prior Publication Data

US 2023/0164030 A1 May 25, 2023

Related U.S. Application Data

(63) Continuation of application No. PCT/CN2021/092942, filed on May 11, 2021.

(30) Foreign Application Priority Data

Jul. 17, 2020 (CN) .......................... 202010699825.2

(51) Int. Cl.
*G06N 20/00* (2019.01)
*H04L 41/082* (2022.01)
*H04L 41/14* (2022.01)

(52) U.S. Cl.
CPC ........... *H04L 41/082* (2013.01); *G06N 20/00* (2019.01); *H04L 41/145* (2013.01)

(58) Field of Classification Search
CPC ...... H04L 41/082; H04L 41/145; G06N 20/00
USPC .......................................................... 709/221
See application file for complete search history.

(56) References Cited

U.S. PATENT DOCUMENTS

| 2017/0076126 | A1* | 3/2017 | Ashok ................. G06K 7/1413 |
| 2019/0036716 | A1* | 1/2019 | Kasaragod ........... H04L 63/104 |
| 2019/0042937 | A1* | 2/2019 | Sheller ..................... G06N 3/08 |
| 2019/0272472 | A1* | 9/2019 | Chen ..................... G06Q 30/02 |
| 2019/0362290 | A1* | 11/2019 | Rogynskyy ........... G06F 16/235 |
| 2019/0385083 | A1* | 12/2019 | Yokoyama .............. H04L 67/10 |
| 2020/0092622 | A1* | 3/2020 | Oh ........................ H04L 47/808 |
| 2021/0176844 | A1* | 6/2021 | Olaleye .................. H05B 47/11 |

(Continued)

FOREIGN PATENT DOCUMENTS

| CN | 105005911 A | 10/2015 |
| CN | 107707657 A | 2/2018 |
| CN | 110569363 A | 12/2019 |

(Continued)

OTHER PUBLICATIONS

Hao et al. WO 2021/137748 (Year: 2019).*

(Continued)

*Primary Examiner* — Dhairya A Patel

(57) ABSTRACT

In a model processing method, a first local server which is disposed between a cloud server and an edge device obtains a data set of the edge device. The data set comprises data used when the edge device performs computing by using a first model provided by the cloud server. The first local server determines, based on the data set of the edge device, a first gradient value for updating the first model, and sends the first gradient value to the cloud server for use by the cloud server to update the first model.

10 Claims, 11 Drawing Sheets

(56) References Cited

U.S. PATENT DOCUMENTS

2023/0030888 A1* 2/2023 Long .................. G01W 1/10
2023/0057398 A1* 2/2023 Hao .................. F17C 13/02

FOREIGN PATENT DOCUMENTS

CN      111369009 A      7/2020
WO   WO2021/137748    * 12/2019

OTHER PUBLICATIONS

Wang Xiaofei et al: "Convergence of Edge Computing and Deep Learning: A Comprehensive Survey", IEEE Communications Surveys and Tutorials, IEEE, USA, vol. 22, No. 2, Jan. 30, 2020 (Jan. 30, 2020), pp. 869-904, XP011790714, total 36 pages.

* cited by examiner

MODEL PROCESSING METHOD FOR CLOUD SERVICE SYSTEM AND CLOUD SERVICE SYSTEM

CROSS-REFERENCE TO RELATED APPLICATIONS

This application is a continuation of International Application PCT/CN2021/092942, filed on May 11, 2021, which claims priority to Chinese Patent Application No. 202010699825.2, filed on Jul. 17, 2020. The disclosures of the aforementioned priority applications are hereby incorporated by reference in their entirety.

TECHNICAL FIELD

This application relates to the field of cloud computing technologies, and in particular, to a model processing method for a cloud service system and a cloud service system.

BACKGROUND

Edge computing is a specific implementation of a cloud computing technology. In an architecture of a cloud server, the cloud server may provide a computing tool such as a machine learning model for a terminal device, and an edge device performs edge computing by using the machine learning model provided by the cloud server. This computing manner can effectively reduce a computing amount of the cloud server, thereby improving operating efficiency of an entire cloud service system.

To ensure computing precision, a provider needs to continuously update the machine learning model provided by the cloud server. In an update technology, latest computing data used by all terminal devices during computing is sent to the cloud server, and the cloud server is relied on to update the machine learning model based on the computing data. However, a computing amount of the cloud server is increased, and operating efficiency of the entire cloud service system is reduced. In another update technology, the terminal device and the cloud server update the machine leaning model in a federated learning manner. A federated learning client may be disposed on the terminal device, and may update the machine learning model based on respective computing data, and send an updated gradient value to the cloud server. A federated learning server may be disposed on the cloud server, and may update the machine learning model based on the received gradient value of the terminal device. However, a computing amount of the terminal device is increased. As computing powers of most existing terminal devices cannot satisfy a requirement of the update technology, overall operation of the cloud service system is also affected.

Therefore, how to update the machine learning model provided by the cloud server in the cloud service system without affecting the overall operation of the cloud service system is a technical problem that needs to be urgently resolved in this field.

SUMMARY

This application provides a model processing method for a cloud service system and a cloud service system, to resolve a technical problem about how to update a machine learning model in a cloud service system in a conventional technology, without affecting overall operating efficiency of a cloud server.

A first aspect of this application provides a cloud service system, including a cloud server and a plurality of local servers. A first local server in the plurality of local servers is connected to the cloud server through a network, and the first local server is further connected to at least one edge device. The first local server is configured to: obtain a data set of the at least one edge device, where the data set includes data used when the at least one edge device performs computing by using a first model provided by the cloud server; determine, based on the data set of the at least one edge device, a first gradient value used to update the first model; and send the first gradient value to the cloud server. The cloud server is configured to: update the first model based on the first gradient value, and send the updated first model to the first local server.

In conclusion, in an entire model update process, the cloud service system provided in this embodiment neither completely relies on the cloud server for data computing, nor relies on the edge device itself for model update, but updates the model by using a computing capability provided by the local server. In this way, on the basis of ensuring update of the model provided by the cloud server, an amount of data exchange between the edge device and the cloud server can be further reduced, and requirements on computing capabilities of the cloud server and the edge device can also be reduced, to further improve operating efficiency of the entire cloud service system.

In an embodiment of the first aspect of this application, the cloud server is further configured to send a plurality of models to the first local server. The first local server is further configured to: receive and store the plurality of models sent by the cloud server; determine at least one model corresponding to a first edge device in the at least one edge device; and send the at least one model to the first edge device.

In conclusion, in the cloud service system provided in this embodiment, the first local server further has functions of storing models and determining different models corresponding to different edge devices, to further reduce computing that needs to be performed by the cloud server, and the cloud server only needs to send models obtained by training to the local server. The local server more specifically delivers the models to corresponding edge devices separately, so that the model used by the first edge device is more precise, to improve precision of computing performed by the first edge device by using the model, thereby further improving the operating efficiency of the entire cloud service system.

In an embodiment of the first aspect of this application, the cloud server is further configured to send a construction tool and a labeling tool to the first local server. The construction tool is used to construct the first local server, and the labeling tool is used to label data in the data set.

In conclusion, in the cloud service system provided in this embodiment, the cloud server may send the construction tool and the labeling tool to the first local server, so that the first local server can perform local server construction and implement related functions based on the tools sent by the cloud server. In this way, implementation of the entire cloud service system is made complete, so that an operator of the cloud service system can complete construction and deployment of the first local server by using the cloud server.

In an embodiment of the first aspect of this application, the first local server is further configured to: label first data in the data set of the at least one edge device by using the labeling tool, to obtain a plurality of labeling results; and when the plurality of labeling results are the same, add the first data to a local data set, where the local data set is used to determine the first gradient value used to update the first model; or when the plurality of labeling results are not completely the same, send the first data to a first device, and add the first data to the local data set after receiving acknowledgment information sent by the first device.

In conclusion, according to a model processing method for the cloud service system provided in this embodiment, the first local server may label the data in the data set of the edge device by using the labeling tool, and add only data with same labeling results to the local data set, to improve accuracy of computing when the added data in the local data set is used for subsequent model update. In addition, data whose labeling results are not completely the same is manually labeled, to further ensure correct labeling of the added data in the local data set.

In an embodiment of the first aspect of this application, the first local server is further configured to: determine a performance parameter used when the at least one connected edge device performs computing by using the plurality of models stored in the first local server, and sort the plurality of models based on the performance parameter; and send sorting information of the plurality of models to the cloud server. The cloud server is configured to sort the plurality of models based on the sorting information of the plurality of models.

In conclusion, in the cloud service system provided in this embodiment, the first local server further has a sorting function. Composition of the models provided by the cloud server may be continuously optimized by sorting the plurality of models by the first local server, to implement "survival of the fittest" for the models, and improve performance of an edge device when the edge device subsequently uses a model for computing, thereby further improving the operating efficiency of the entire cloud service system.

In an embodiment of the first aspect of this application, the cloud server is specifically configured to update the first model based on the first gradient value and a gradient value that is sent by at least one second local server in the plurality of local servers.

In conclusion, in the cloud service system provided in this embodiment, the models used by the edge device may be updated in a manner in which the cloud server and the local server perform collaborative update. A structure of this collaborative update can implement federated learning. A federated learning client may be deployed on the local server. In this way, the local server replaces a terminal device to update the models and interact with the cloud server, to further reduce computing performed by the terminal device, and reduce an amount of data exchange between the edge device and the cloud server, thereby further improving the operating efficiency of the entire cloud service system.

A second aspect of this application provides a model processing method for a cloud service system. After a local server disposed between a cloud server and an edge device obtains data used when the edge device performs computing by using a model, the model may be updated by using the local server, and a gradient value obtained after the model is updated is sent to the cloud server. Finally, the cloud server updates the model based on the gradient value of the local server.

In conclusion, according to the model processing method for a cloud service system provided in this embodiment, in an entire model update process, the cloud service system neither completely relies on the cloud server for data computing, nor relies on the edge device itself for model update, but updates the model by using a computing capability provided by the local server. In this way, on the basis of ensuring update of the model provided by the cloud server, an amount of data exchange between the edge device and the cloud server can be further reduced, and requirements on computing capabilities of the cloud server and the edge device can also be reduced, to further improve operating efficiency of the entire cloud service system.

In an embodiment of the second aspect of this application, before a first local server obtains a data set of at least one edge device, the cloud server may further deliver models to edge devices by using the first local server. Specifically, after receiving and storing the plurality of models sent by the cloud server, the first local server separately determines a model corresponding to each of the at least one edge device, for example, determines at least one model corresponding to a first edge device, and then sends the determined model to the first edge device.

In conclusion, according to the model processing method for a cloud service system provided in this embodiment, the first local server further has functions of storing models and determining different models corresponding to different edge devices, to further reduce computing that needs to be performed by the cloud server, and the cloud server only needs to send models obtained by training to the local server. The local server more specifically delivers the models to corresponding edge devices separately, so that the model used by the first edge device is more precise, to improve precision of computing performed by the first edge device by using the model, thereby further improving the operating efficiency of the entire cloud service system.

In an embodiment of the second aspect of this application, to implement the cloud service system, alternatively, before the first local server starts to obtain the data set of the at least one edge device, the first local server receives a construction tool and a labeling tool that are sent by the cloud server, to establish the first local server by using the construction tool, and label data in the data set by using the labeling tool.

In conclusion, according to the model processing method for a cloud service system provided in this embodiment, the cloud server may send the construction tool and the labeling tool to the first local server, so that the first local server can perform local server construction and implement related functions based on the tools sent by the cloud server. In this way, implementation of the entire cloud service system is made complete, so that an operator of the cloud service system can complete construction and deployment of the first local server by using the cloud server.

In an embodiment of the second aspect of this application, labeling performed by the first local server on the data set specifically includes: The first local server labels first data in the data set of the at least one edge device by using the labeling tool; and when a plurality of labeling results of the plurality of models are the same, the first local server adds the first data to a local data set, where the local data set is used when the first local server subsequently updates a first model; or when a plurality of labeling results of the plurality of models are not completely the same, a manual recheck step needs to be performed. The first local server may send the first data to a first device used by a working person, to enable the working person to perform manual labeling on the first data, and can add the first data to the local data set only after receiving acknowledgement information sent by the first device used by the working person.

In conclusion, according to the model processing method for a cloud service system provided in this embodiment, the first local server may label the data in the data set of the edge device by using the labeling tool, and add only data with same labeling results to the local data set, to improve accuracy of computing when the added data in the local data set is used for subsequent model update. In addition, data whose labeling results are not completely the same is manually labeled, to further ensure correct labeling of the added data in the local data set.

In an embodiment of the second aspect of this application, the first local server further has a function of sorting models. Specifically, the first local server may sort the plurality of models based on a performance parameter used when the at least one connected edge device performs computing by using the plurality of models; and send sorting information of the plurality of models to the cloud server.

In conclusion, according to the model processing method for a cloud service system provided in this embodiment, composition of the models provided by the cloud server can be continuously optimized after the cloud server sorts the plurality of models, to implement "survival of the fittest" for the models, and improve performance of an edge device when the edge device subsequently uses a model for computing, thereby further improving the operating efficiency of the entire cloud service system.

A third aspect of this application provides a model processing method for a cloud service system, including: A cloud server receives a first gradient value sent by a first local server, updates a first model based on the first gradient value, and sends the updated first model to the first local server.

In conclusion, according to the model processing method for a cloud service system provided in this embodiment, from a perspective of the cloud server, the cloud server only needs to collaborate with the local server to update the first model of an edge device. In an entire model update process, the cloud service system neither completely relies on the cloud server for data computing, nor relies on the edge device itself for model update, but updates the model by using a computing capability provided by the local server. In this way, on the basis of ensuring update of the model provided by the cloud server, an amount of data exchange between the edge device and the cloud server can be further reduced, and requirements on computing capabilities of the cloud server and the edge device can also be reduced, to further improve operating efficiency of the entire cloud service system.

In an embodiment of the third aspect of this application, the cloud server specifically updates, in a synchronous update manner, the first model jointly based on the first gradient value sent by the first local server and a gradient value sent by at least one second local server.

In conclusion, according to the model processing method for a cloud service system provided in this embodiment, the model used by the edge device may be updated in a manner in which the cloud server and the local server perform collaborative update. A structure of this collaborative update can implement federated learning. A federated learning client may be deployed on the local server. In this way, the local server replaces a terminal device to update the model and interact with the cloud server, to further reduce computing performed by the terminal device, and reduce the amount of data exchange between the edge device and the cloud server, thereby further improving the operating efficiency of the entire cloud service system.

In an embodiment of the third aspect of this application, to implement the cloud service system, alternatively, before the first local server starts to obtain a data set of at least one edge device, the cloud server may send a construction tool and a labeling tool to the first local server, so that the first local server can establish the first local server based on the construction tool, and label data in the data set by using the labeling tool.

In conclusion, according to the model processing method for a cloud service system provided in this embodiment, the cloud server may send the construction tool and the labeling tool to the first local server, so that the first local server can perform local server construction and implement related functions based on the tools sent by the cloud server. In this way, implementation of the entire cloud service system is made complete, so that an operator of the cloud service system can complete construction and deployment of the first local server by using the cloud server.

In an embodiment of the third aspect of this application, the first local server further has a function of sorting models. Specifically, the cloud server may receive sorting information of a plurality of models that is sent by the first local server. In this way, composition of the models provided by the cloud server can be continuously optimized after the cloud server sorts the plurality of models, to implement "survival of the fittest" for the models, and improve performance of an edge device when the edge device subsequently uses a model for computing, thereby further improving the operating efficiency of the entire cloud service system.

A fourth aspect of this application provides a model processing apparatus for a cloud service system, and the model processing apparatus for a cloud service system may be used as the first local server in embodiments of the first aspect and the second aspect of this application, and perform the method performed by the first local server. The apparatus includes: an obtaining module, configured to obtain a data set of at least one edge device, where the data set includes data used when the at least one edge device performs computing by using a first model provided by the cloud server; a processing module, configured to determine, based on the data set of the at least one edge device, a first gradient value used to update the first model; and a transmission module, configured to send the first gradient value to the cloud server.

In an embodiment of the fourth aspect of this application, the transmission module is further configured to receive a plurality of models sent by the cloud server, and store the plurality of models into a storage module. The processing module is further configured to determine at least one model corresponding to a first edge device in the at least one edge device. The transmission module is further configured to send the at least one model to the first edge device.

In an embodiment of the fourth aspect of this application, the transmission module is further configured to receive a construction tool and a labeling tool that are sent by the cloud server. The construction tool is used to construct the first local server, and the labeling tool is used to label data in the data set.

In an embodiment of the fourth aspect of this application, the processing module is further configured to: label first data in the data set of the at least one edge device by using the labeling tool, to obtain a plurality of labeling results; and when the plurality of labeling results are the same, the first local server adds the first data to a local data set, where the local data set is used to determine the first gradient value used to update the first model. The transmission module is further configured to: when the plurality of labeling results are not completely the same, send the first data to a first device, and add the first data to the local data set after receiving acknowledgment information sent by the first device.

In an embodiment of the fourth aspect of this application, the processing module is further configured to: determine a performance parameter used when the at least one connected edge device performs computing by using the plurality of models stored in the first local server, and sort the plurality of models based on the performance parameter. The transmission module is further configured to send sorting information of the plurality of models to the cloud server.

A fifth aspect of this application provides a model processing apparatus for a cloud service system, and the model processing apparatus for a cloud service system may be used as the cloud server in embodiments of the first aspect and the third aspect of this application, and perform the method performed by the cloud server. The apparatus includes: a transmission module, configured to receive a first gradient value sent by a first local server, where the first gradient value is used to update a first model provided by the cloud server; and a processing module, configured to update the first model based on the first gradient value. The transmission module is further configured to send the updated first model to the first local server.

In an embodiment of the fifth aspect of this application, the processing module is specifically configured to update the first model based on the first gradient value and a gradient value that is sent by at least one second local server in the plurality of local servers.

In an embodiment of the fifth aspect of this application, the transmission module is further configured to send a construction tool and a labeling tool to the first local server. The construction tool is used to construct the first local server, and the labeling tool is used to label data in the data set.

In an embodiment of the fifth aspect of this application, the transmission module is further configured to receive sorting information of a plurality of models that is sent by the first local server. The processing module is further configured to sort the plurality of models based on the sorting information of the plurality of models.

According to a sixth aspect, an embodiment of this application provides a computing apparatus, including a processor and a communications interface. The processor sends data by using the communications interface. The processor is configured to implement the method performed by the first local server in the first aspect or the second aspect.

In a possible design, the computing apparatus further includes a memory. The memory is configured to store program code, and the processor executes the program code stored in the memory, to enable the computing apparatus to perform the method performed by the first local server in the first aspect or the second aspect.

According to a seventh aspect, an embodiment of this application provides a computing apparatus, including a processor and a communications interface. The processor sends data by using the communications interface. The processor is configured to implement the method performed by the cloud server in the first aspect or the third aspect.

In a possible design, the computing apparatus further includes a memory. The memory is configured to store program code, and the processor executes the program code stored in the memory, to enable the computing apparatus to perform the method performed by the cloud server in the first aspect or the third aspect.

DESCRIPTION OF EMBODIMENTS

Figure 1:
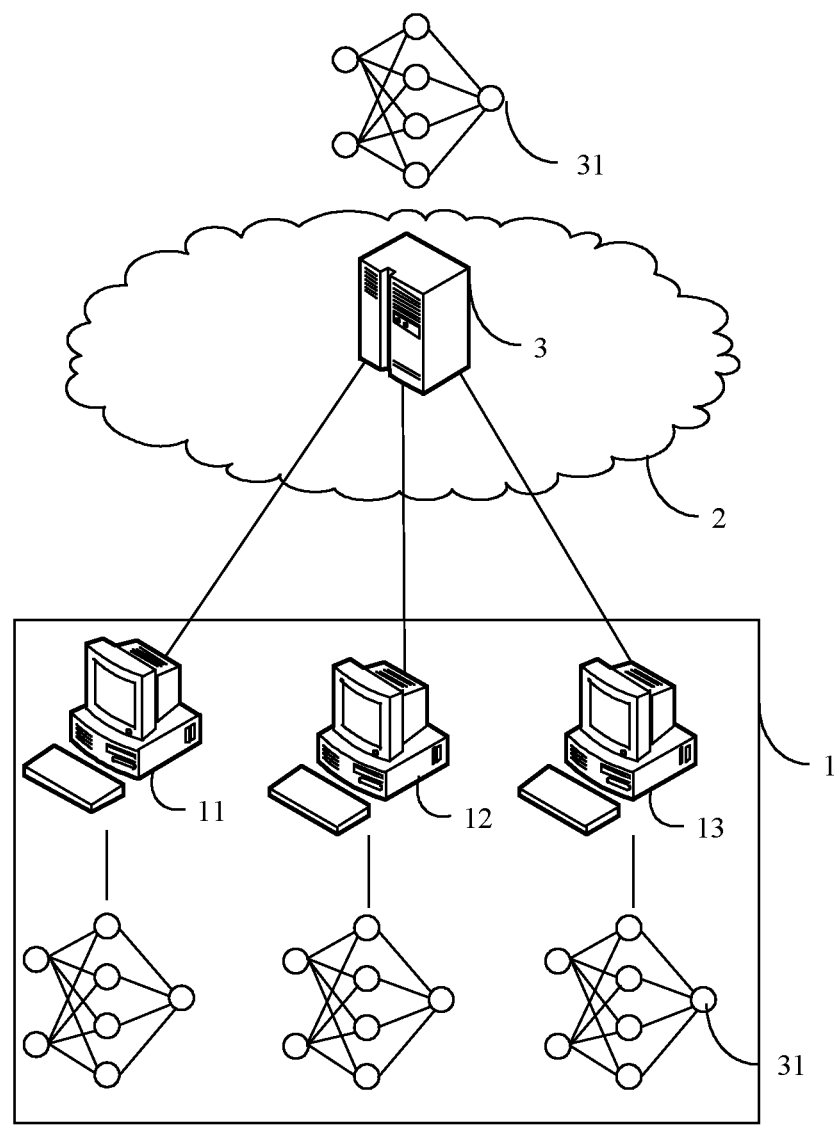
FIG. 1 is a schematic diagram of an application scenario of this application.

FIG. 1 is a schematic diagram of an application scenario of this application. This application may be applied to the field of cloud computing technologies. A provider of a cloud computing service may dispose one or more cloud servers 3 in an Internet 2, and the cloud server 3 provides the cloud computing service. For example, when a terminal device 1 used by a user requires some software and hardware computing resources, the terminal device 1 may directly use, or apply to the provider for, or pay some fees to the provider for software and hardware resources provided by the cloud server 3, or the like, so that the terminal device 1 uses the cloud computing service provided by the provider. Because the computing resources used by the terminal device 1 are provided by the cloud server 3 disposed by the provider on a network side, such a scenario in which computing is performed by using network resources may also be referred to as "cloud computing", and the cloud server 3 and the terminal device 1 together may also be referred to as a "cloud service system.

In a specific implementation of the scenario shown in FIG. 1, the terminal device 1 may be an edge device configured to implement edge computing. Edge computing means that a device on a side close to an object or a data source in a cloud service system can provide a computing service. That is, in FIG. 1, the terminal device 1 may perform edge computing in collaboration with the cloud server 3, and the terminal device 1 performing edge computing may also be referred to as an "edge device". For example, after processing local data at a low latency, the terminal device 1 can send the processed data to the cloud server 3, so that the terminal device 1 does not need to send the data to the cloud server 3 for computing. This reduces computing workload of the cloud server 3, and improves operating efficiency of the cloud service system.

More specifically, training and computing of a machine learning model (model for short in embodiments of this application) are a common edge computing manner in a cloud service system. For example, the provider of the cloud server 3 collects a large amount of training data and performs training by using a high-performance server, to obtain a machine learning model 31 that can be used to recognize an animal category in images, and delivers the machine learning model 31 to the terminal device 1 that needs to use the machine learning model. As shown in FIG. 1, the cloud server 3 may deliver the machine learning model 31 to three terminal devices 1 numbered 11 to 13, and each terminal device 1 can recognize, by using the received machine learning model 31, the animal category in images separately collected by the terminal device 1, to implement an edge computing scenario in which the model provided by the cloud server 3 performs computing on the terminal device 1.

In addition, there may be a difference between the training data collected by the provider and computing data used when the terminal device 1 performs edge computing, and as an external condition changes, the computing data may also change at any time. As a result, computing precision of edge computing performed by the machine learning model 31 may decrease. Therefore, in the foregoing edge computing scenario, after sending the machine learning model 31 to the terminal device 1, the cloud server 3 may further continue to update the machine learning model 31, and send the updated machine learning model 31 to the terminal device 1, to improve computing precision of edge computing performed by the terminal device 1 by using the machine learning model 31.

In a first manner of updating the machine learning model 31, each terminal device 1 sends data used for computing performed by using the machine learning model 31 to the cloud server 3, and the cloud server 3 updates the machine learning model 31 based on the data sent by each terminal device 1, and sends the updated machine learning model 31 to each terminal device 1. However, this update manner completely relies on a computing capability of the cloud server 3, and causes a large amount of interactive data to the cloud server 3 and the terminal device 1, increasing a bandwidth requirement. Consequently, the operating efficiency of the entire cloud service system is reduced. In addition, relatively sensitive data processed by some terminal devices 1 is also directly sent to the cloud server 3, and data security cannot be ensured in this process. In addition, because each terminal device 1 directly uploads data to the cloud server, data sharing cannot be implemented between different terminal devices, causing a "data island" problem.

Figure 2:
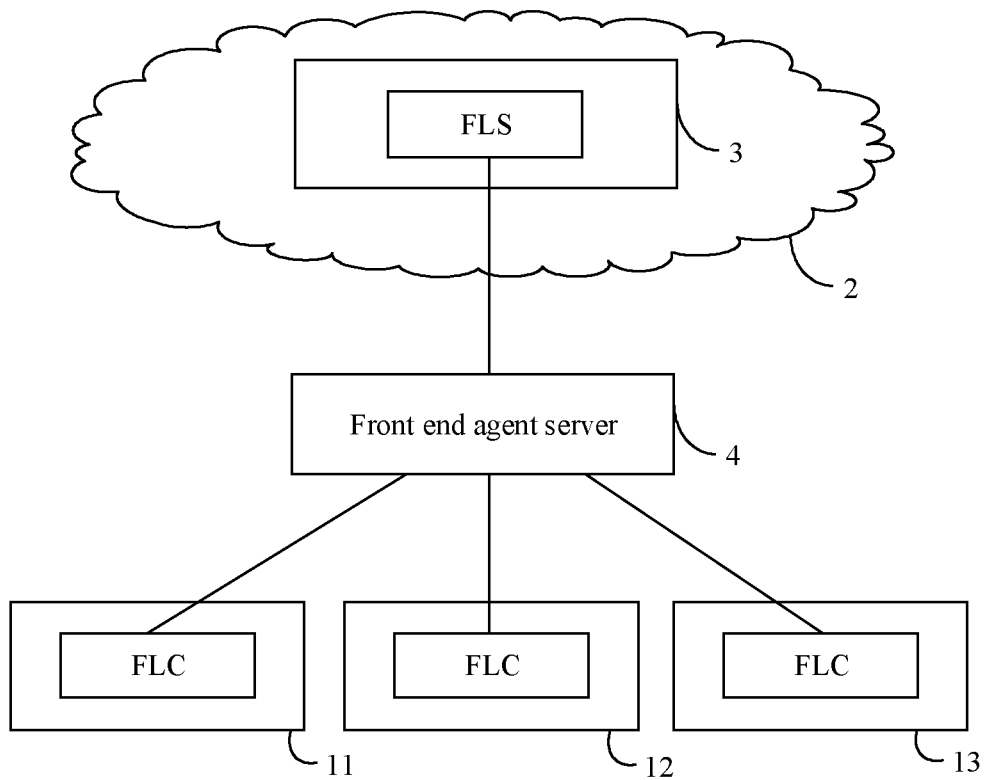
FIG. 2 is a schematic diagram of a structure of a cloud service system.

In a second manner of updating the machine learning model 31, FIG. 2 is a schematic diagram of a structure of a cloud service system. Based on the scenario shown in FIG. 1, the system shown in FIG. 2 updates the machine learning model 31 by using a federated learning service. A federated learning server (FLS) is deployed in the cloud server 3, a federated learning client (FLC) is deployed in each terminal device 1, and all FLCs may be connected to the FLS by using a front end agent server. This structure may also be referred to as an "edge cloud collaboration" update structure. In the cloud service system shown in FIG. 2, the FLC deployed on each terminal device 1 may autonomously update the machine learning model 31 based on data used when the terminal device 1 performs computing by using the machine learning model 31, and send a gradient value obtained by updating the machine learning model 31 to the FLS by using the front end agent server 4. In this case, the FLS may update the machine learning model 31 based on the gradient values sent by the plurality of FLCs, and send the updated machine learning model 31 to each terminal device 1. However, this update manner raises a high requirement on a computing capability of the terminal device 1. In addition to performing computing by using the machine learning model 31, the terminal device 1 further needs to compute a gradient value for updating the machine learning model 31. However, in actual use, more terminal devices 1 have limited computing capabilities, and it is difficult for the terminal devices 1 to directly participate in update of the machine learning model 31 by using the limited computing capabilities.

In conclusion, the foregoing two manners of updating the machine learning model 31 have respective disadvantages. When the cloud server 3 is relied on to perform update, system performance is reduced and a "data island" problem is caused; or when the terminal device 1 is relied on to perform update, implementation is difficult due to a limited computing capability. This application provides a model processing method for a cloud service system and a cloud service system. A local server is disposed between a cloud server and a terminal device. The local server, together with the cloud server, updates a machine learning model based on data of at least one connected terminal device, to ensure that when the machine learning model is updated, requirements on computing capabilities of the cloud server and the terminal device are reduced, and data exchange between the cloud server and the terminal device is reduced, thereby improving operating efficiency of the entire cloud service system.

Specific embodiments are used below to describe in detail the technical solutions of this application. The following several specific embodiments may be combined with each other, and a same or similar concept or process may not be described repeatedly in some embodiments.

Figure 3:
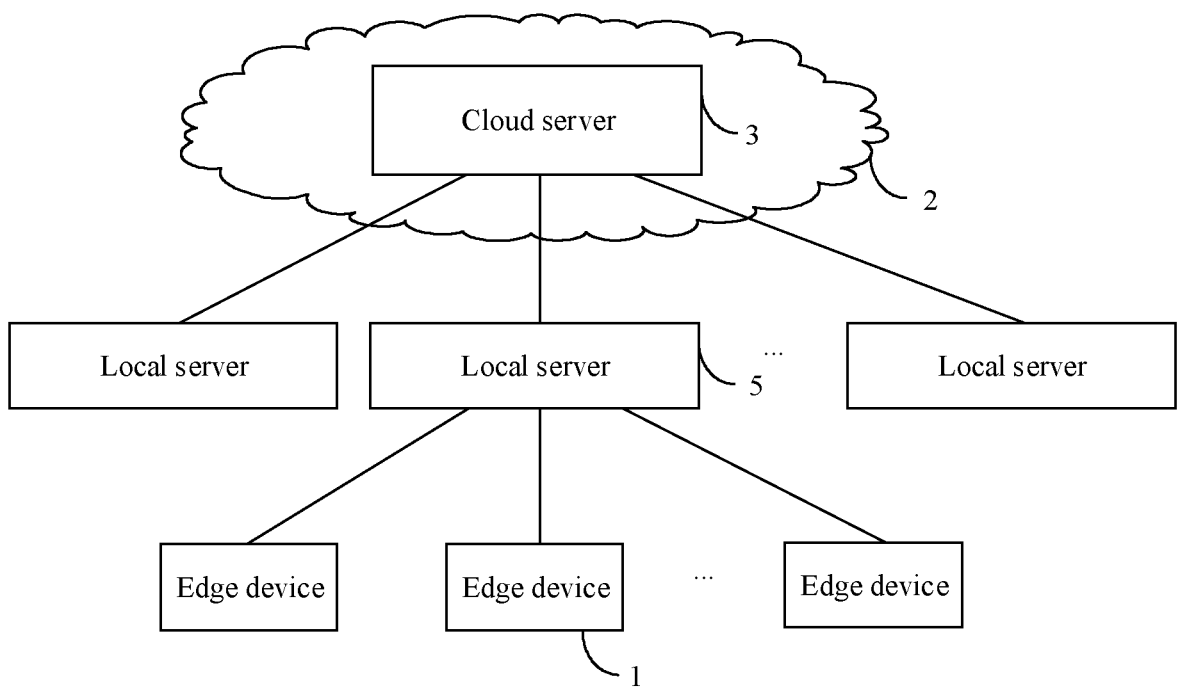
FIG. 3 is a schematic diagram of a structure of an embodiment of a cloud service system according to this application.

FIG. 3 is a schematic diagram of a structure of an embodiment of a cloud service system according to this application. The cloud service system shown in FIG. 3 includes a cloud server 3 and a plurality of local servers 5. For example, the plurality of local servers 5 in FIG. 3 are separately connected to the cloud server 3. In addition, the local server 5 may further be connected to at least one edge device 1, and the edge device 1 may be a terminal device capable of performing edge computing. For example, in FIG. 3, one local server 5 may be connected to a plurality of edge devices 1. The local server 5 may be a server disposed at a place at which the plurality of edge devices are located. In an example scenario, a company B located in a city A disposes a cloud server in the company and provides a machine learning model. In this case, when a company D located in a city C uses a plurality of edge devices, a local server may be disposed in the company D, so that the plurality of edge devices of the company D are connected to the local server disposed in the company D. In addition, the local server disposed in the company D may be connected to the cloud server disposed in the company B by using an Internet connection.

Specifically, the cloud server 3 may provide the machine learning model for the edge device 1 that needs a machine learning model, and one or more machine learning models may be provided by the cloud server 3 for each edge device 1. For example, in the system shown in FIG. 3, after obtaining a plurality of machine learning models by training, the cloud server 3 may send the plurality of machine learning models to the connected local server 5, and the local server 5 sends the machine learning models to the corresponding edge devices 1. For example, after machine learning models used to implement different functions are obtained by training in the cloud server 3, assuming that at least one edge device connected to the local server 5 needs to use a machine learning model used to recognize an animal category, the cloud server 3 sends, to the local server 5, a plurality of machine learning models used to recognize the animal category. Then, the local server 5 sends the plurality of machine learning models to connected edge devices, and the edge devices that receive the machine learning models may perform edge computing for animal category recognition based on the machine learning models. In this process, the local server 5 may function as a gateway.

Further, in the cloud service system shown in FIG. 3 provided in this application, on the basis of implementing the edge computing, the local server 5 and the cloud server 3 may further collaboratively update the machine learning models provided by the cloud server. The following uses one local server (denoted as a first local server) connected to the cloud server and one edge device (denoted as a first edge device) connected to the first local server as an example to describe a procedure in which the first local server and the cloud server collaboratively update a machine learning model used by the first edge device in the model processing method for a cloud service system provided in this embodiment.

Figure 4:
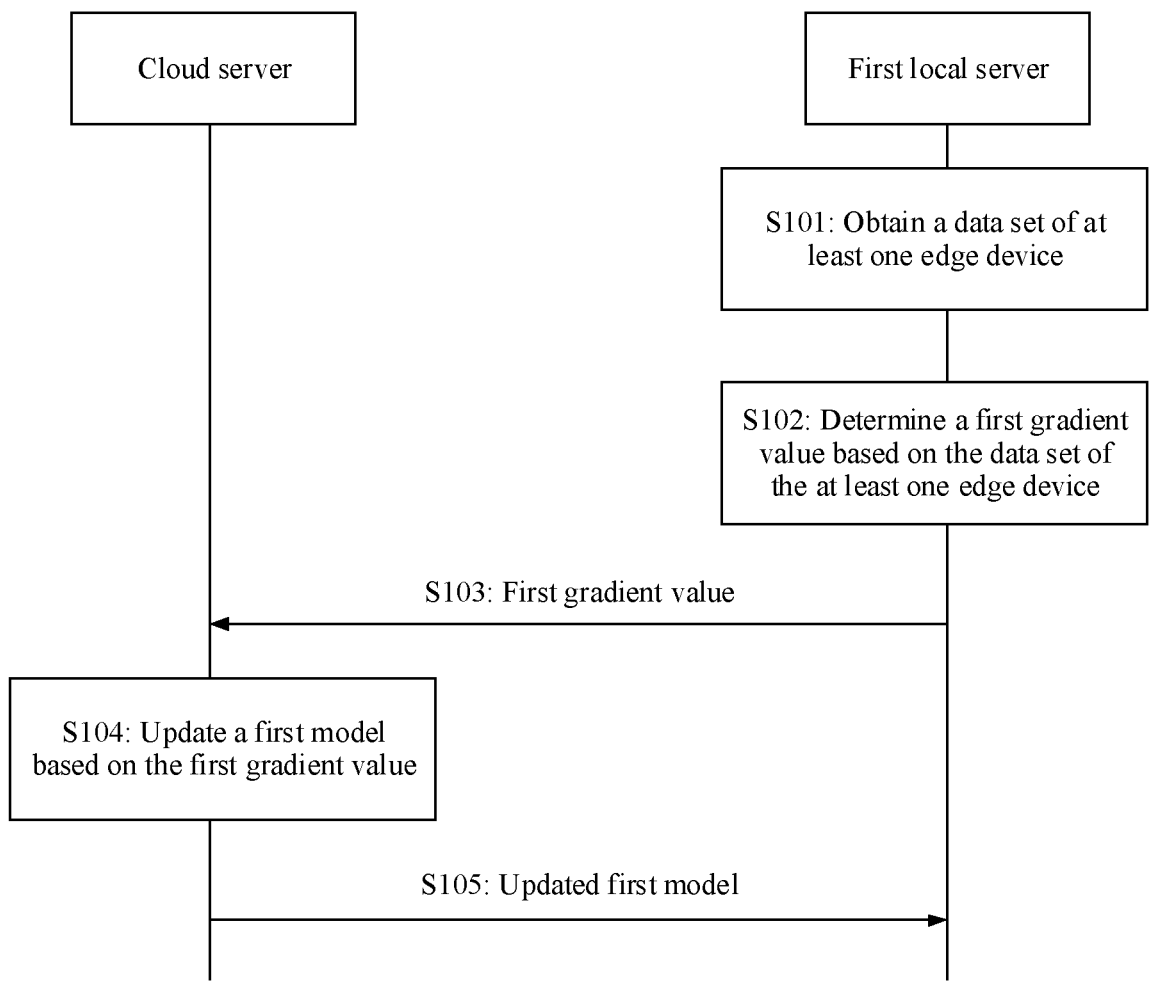
FIG. 4 is a schematic flowchart of an embodiment of a model processing method for a cloud service system according to this application.

FIG. 4 is a schematic flowchart of an embodiment of a model processing method for a cloud service system according to this application. An execution body of the method shown in FIG. 4 may be applied to the cloud service system shown in FIG. 3, the method is performed by the cloud server 3 and any local server 5 connected to the cloud server 3, and the local server is further connected to at least one edge device 1.

S101: The first local server obtains a data set of at least one connected edge device.

Specifically, the model processing method provided in this embodiment is on the basis that the cloud server has sent a machine learning model to the local server, and the local server has sent the machine learning models to the edge device for use. In S101, to update the machine learning model, when all edge devices connected to the first local server perform computing by using the machine learning models, data used for computing is all sent to the first local server.

It can be understood that each edge device may use one or more machine learning models, and any one of the machine learning models is used as a first model for description. In S101, data used when each edge device performs computing by using the first model is denoted as one data set, and the first local server receives data that is used when the connected edge device performs computing by using the first model and that is sent by the connected edge device.

For example, the cloud server sends the first model that recognizes an animal category in an image as a cat or a dog to the first local server, and after sending the first model to two edge devices connected to the first local server, in S101, the first local server may receive a data set sent by one edge device, where the data set includes two images of cats that are used when computing is performed by using the first model, and receive a data set sent by the other edge device, where the data set includes two images of dogs and one image of a cat that are used when computing is performed by using the first model.

S102: The first local server obtains, by computing based on the data set of the at least one edge device obtained in S101, a first gradient value used to update the first model.

Specifically, in addition to providing a function of a gateway, the first local server provided in this embodiment has a capability of obtaining a parameter for updating a model. After a particular quantity of data sets are obtained, a parameter for updating the first model, for example, a gradient value used to update the first model can be obtained by computing. In this update manner, the cloud server does not participate in the update, and the first model is not directly updated by the performed computing; instead, the parameter for updating the first model is obtained. Therefore, this update manner may be referred to as "local update".

For example, in the foregoing example, because images of cats and dogs collected when the cloud server trains the first model are different from images used when the edge device actually performs computing by using the first model, the first local server may locally update the first model by using two images of dogs and three images of cats after receiving the five images, to obtain the first gradient value. Assuming that a parameter in the first model is 2, and the parameter becomes 2.1 after the first local server locally updates the first model, the first gradient value is a change value of the two values: 0.1.

S103: After obtaining the first gradient value of the first model in S102, the first local server sends the obtained first gradient value to the cloud server in S103, and correspondingly, the cloud server receives the first gradient value sent by the first local server.

Specifically, due to a limitation of the computing data obtained by the first local server, only the parameter for updating the first model is obtained in the computing performed by the first local server, and the first model is not updated. After the first local server sends the first gradient value to the cloud server, the cloud server updates the first model based on the first gradient value. In this process, although the first local server does not actually complete the update of the first model, the first local server also participates in the computing for updating the first model by the cloud server (the computing of the first gradient value used to update the first model). Therefore, this process may also be referred to as "collaborative update" performed by the cloud server and the local server on the first model.

S104: The cloud server updates the first model based on the first gradient value sent by the first local server.

Specifically, in this embodiment of this application, the cloud server and the local server may collaboratively update the first model in a synchronous update manner or an asynchronous update manner. The following provides description with reference to the accompanying drawings.

Figure 5:
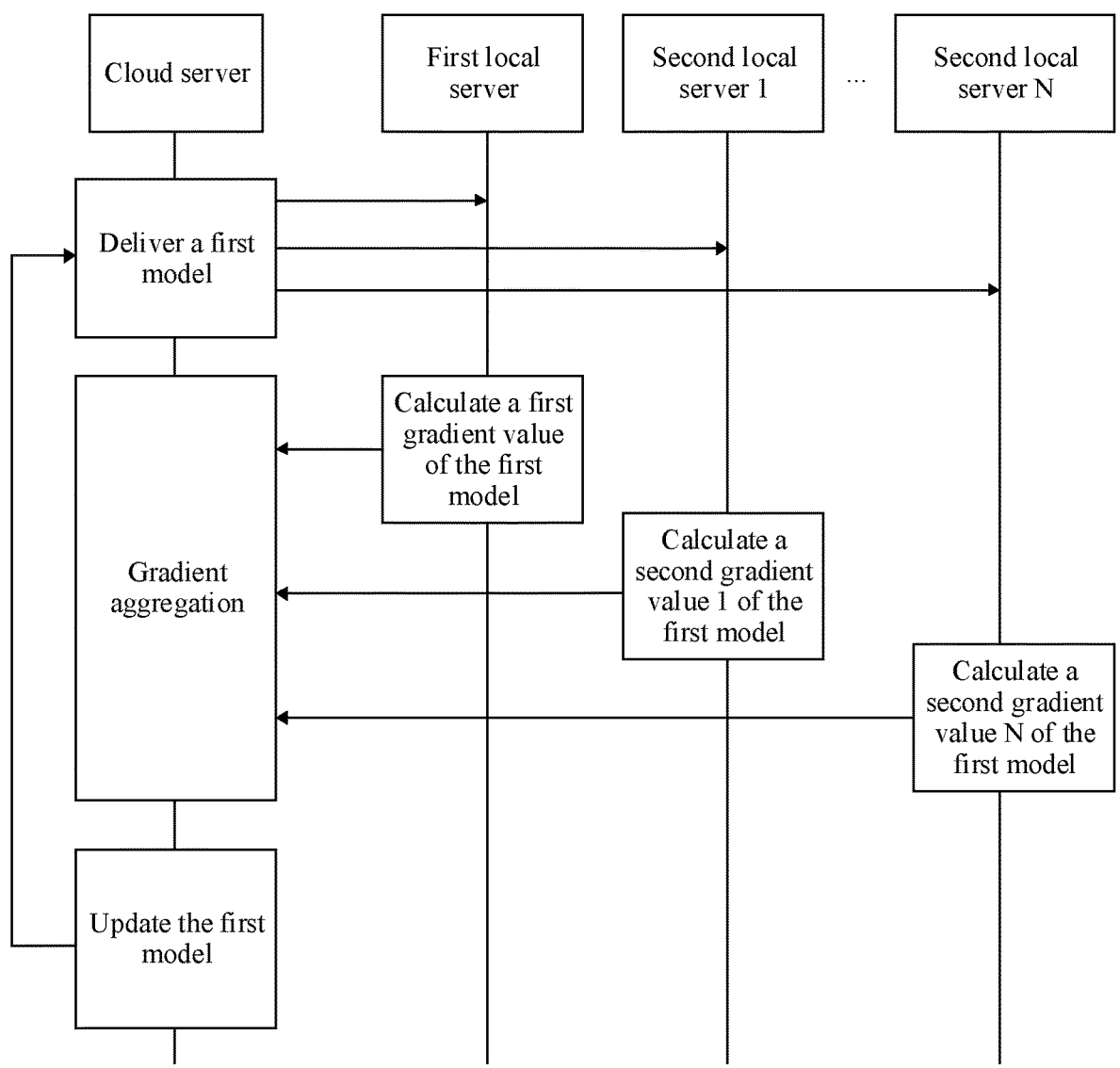
FIG. 5 is a schematic flowchart of synchronous model update according to this application.

1. Synchronous Update:

FIG. 5 is a schematic flowchart of synchronous model update according to this application. This synchronous update manner may be applied to the cloud service system shown in FIG. 3, and local servers, other than the first local server in the foregoing example, that are connected to the cloud server are all denoted as second local servers. After obtaining the first model by training, the cloud server first sends the first model to all local servers. Subsequently, in an actual use process, each local server computes, by using steps S101 to S103, the gradient value used to update the first model. For example, the first local server obtains the first gradient value by computing and sends the first gradient value to the cloud server, a second local server 1 obtains a second gradient value 1 by computing and sends the second gradient value 1 to the cloud server, and so on. All the local servers may perform computing on the first model based on respective data to obtain gradient values, and send the gradient values to the cloud server at a same moment. After simultaneously receiving the gradient values that are sent by the plurality of local servers and used to update the first model, the cloud server may perform gradient aggregation on all the gradient values, and finally update the first model. In simple example aggregation, assuming that the parameter in the first model is 2, and the gradient values received by the cloud server are respectively 0.1, −0.2, and 0.3, the cloud server may add up these gradients to obtain an updated parameter of the first model: 2.2. After updating the first model, the cloud server may send the first model to all the local servers again, and may continue to repeat the process shown in FIG. 5.

Figure 6:
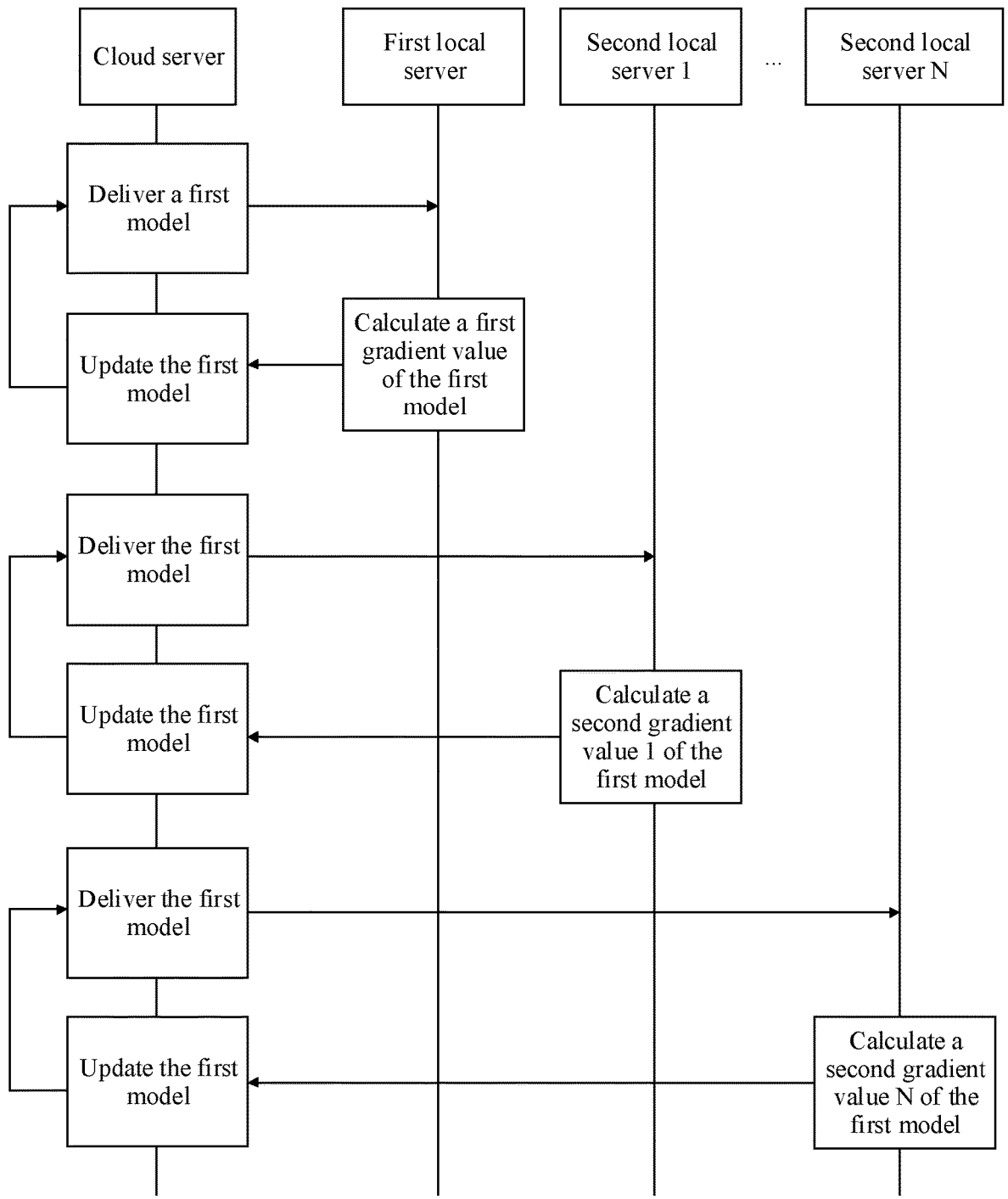
FIG. 6 is a schematic flowchart of asynchronous model update according to this application.

2. Asynchronous Update:

FIG. 6 is a schematic flowchart of asynchronous model update according to this application. An execution body is the same as that in FIG. 5. After obtaining the first model by training, the cloud server first sends the first model to all the local servers. Then, in an actual use process, after computing, by using steps S101 to S103, the gradient value used to update the first model, each local server may separately send the updated gradient value to the cloud server. For example, the first local server obtains the first gradient value by computing and sends the first gradient value to the cloud server. In this case, after updating the first model, the cloud server may return the updated first model to the first local server. Subsequently, when a second local server 1 obtains a second gradient value 1 by computing and sends the second gradient value 1 to the cloud server, in this case, the cloud server updates the first model based on the second gradient value 1 on the basis that the first model has been updated based on the first gradient value; and returns the updated first model to the second local server 1, and so on. After receiving the gradient values sent by all the local servers and performing update separately, the cloud server completes an entire asynchronous update process, and may continue to repeat the process shown in FIG. 6.

S105: The cloud server sends the updated first model to the first local server. The first local server receives the updated first model sent by the cloud server, and sends the updated first model to a corresponding edge device, so that the edge device may subsequently perform computing by using the updated first model. The corresponding edge device may be an edge device that needs to use the first model, or an edge device that already includes the first model but needs to update the first model.

In conclusion, according to the model processing method for a cloud service system provided in this embodiment, after a local server disposed between the cloud server and an edge device obtains data used when the edge device performs computing by using a model, the model may be updated by using the local server, and a gradient value obtained after the model is updated is sent to the cloud server. Finally, the cloud server updates the model based on the gradient value of the local server. In the entire model update process, the cloud service system neither completely relies on the cloud server for data computing, nor relies on the edge device itself for model update, but updates the model by using a computing capability provided by the local server. In this way, on the basis of ensuring update of the model provided by the cloud server, an amount of data exchange between the edge device and the cloud server can be further reduced, and requirements on computing capabilities of the cloud server and the edge device can also be reduced, to further improve operating efficiency of the entire cloud service system.

Optionally, in a specific implementation of the foregoing embodiment, an FLC may be deployed in the first local server, and an FLC may be deployed in the cloud server. In this case, the first local server may replace the edge device to implement the federated learning update technology shown in FIG. 2. Because a computing capability of the first local server provided in this embodiment may be higher than that of the edge device, and the edge device may not need to perform model update, a requirement on the computing capability of the edge device can also be reduced compared with the technology in FIG. 2 in which an FLC is deployed in an edge device. In this way, the operating efficiency of the cloud service system is improved.

Figure 7:
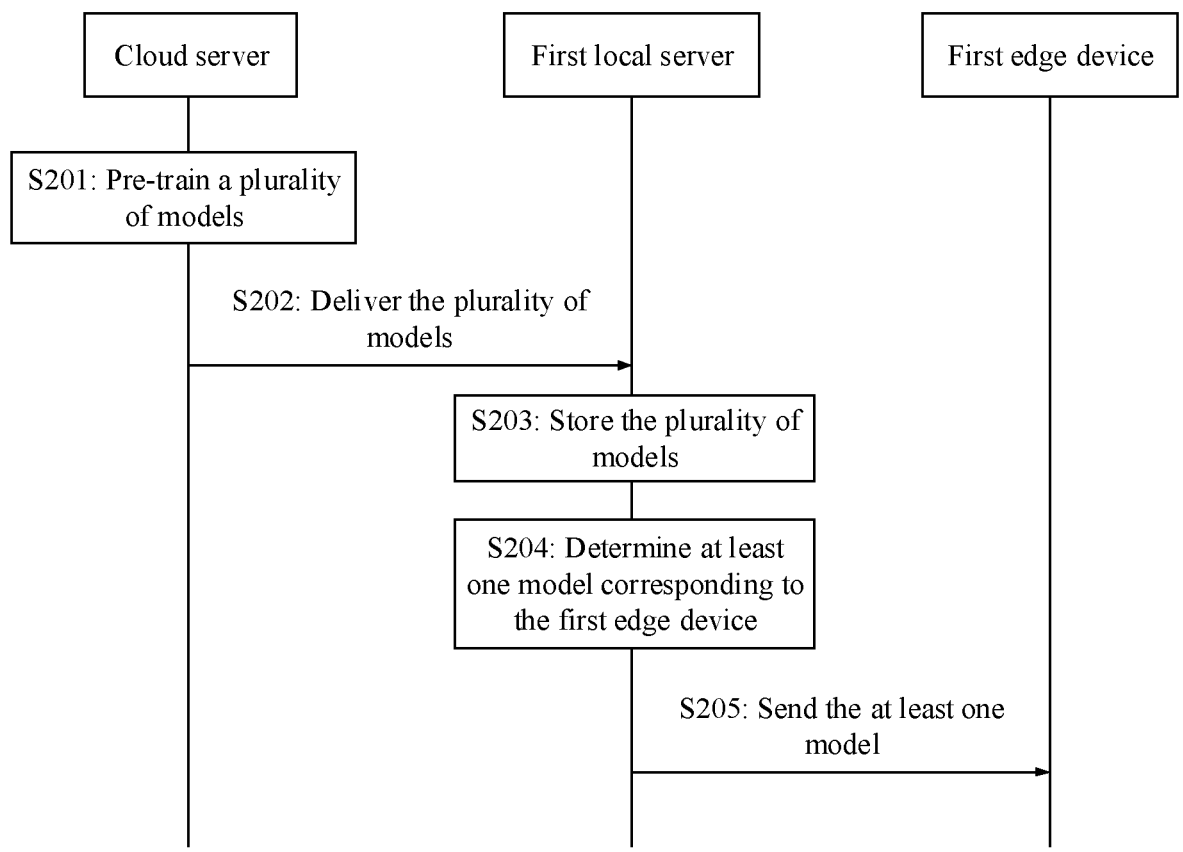
FIG. 7 is a schematic flowchart of an embodiment of a model processing method for a cloud service system according to this application.

Further, the local server provided in this embodiment may further have a function of storing machine learning models, and may separately send the stored models to corresponding edge devices based on requirements of different edge devices. For example, FIG. 7 is a schematic flowchart of an embodiment of a model processing method for a cloud service system according to this application. The method shown in FIG. 7 may be applied to the cloud service system shown in FIG. 3, and may be performed before S101 in the embodiment shown in FIG. 4.

S201: A cloud server pre-trains a plurality of models. The cloud server may obtain a plurality of machine learning models based on a training data set provided by a provider. For example, after the provider collects images of different animals, and labels images of cats and dogs in the images, a model obtained by training by the cloud server may be used to recognize whether an animal in the image is a cat or a dog.

S202: The cloud server sends the plurality of models obtained by training in S201 to a first local server. The first local server receives the plurality of models sent by the cloud server.

S203: After receiving the plurality of models, the first local server stores the plurality of models in storage space of the first local server.

S204: The first local server determines at least one model corresponding to a first edge device.

Specifically, some or all of the plurality of models obtained through pre-training by the cloud server in this embodiment may be sent to the first local server. After receiving the plurality of models, the first local server determines at least one model corresponding to each connected edge device. Any edge device connected to the first local server is denoted as a first edge device, and the first local server may determine, based on a magnitude of a computing power of the first edge device, a computing requirement of the first edge device, a model type supported by the first edge device, or the like, a model corresponding to the first edge device. For example, if there are a plurality of models that recognize an animal category in an image as a cat or a dog, and sizes of the models are different, when computing performance of the first edge device is relatively good, it may be determined that the first edge device corresponds to a relatively large model; or when the computing performance of the first edge device is relatively poor, it may be determined that the first edge device corresponds to a relatively small model.

S205: The first local server sends, to the first edge device, the at least one model determined in S204.

It can be understood that the first local server may determine a model corresponding to each edge device connected to the first local server, and separately send the corresponding model to each edge device. In addition, after receiving the model, the first edge device may perform computing by using the model. It can be understood that the at least one model sent by the first local server to the first edge device includes the first model in the foregoing embodiment.

In conclusion, according to the model update method for a cloud service system provided in this embodiment, the first local server further has functions of storing models and determining models corresponding to edge devices, to further reduce computing that needs to be performed by the cloud server, and the cloud server only needs to send models obtained by training to the local server. The local server more specifically delivers the models to corresponding edge devices separately, so that the model used by the first edge device is more precise, to improve precision of computing performed by the first edge device by using the model, thereby further improving the operating efficiency of the entire cloud service system.

Figure 8:
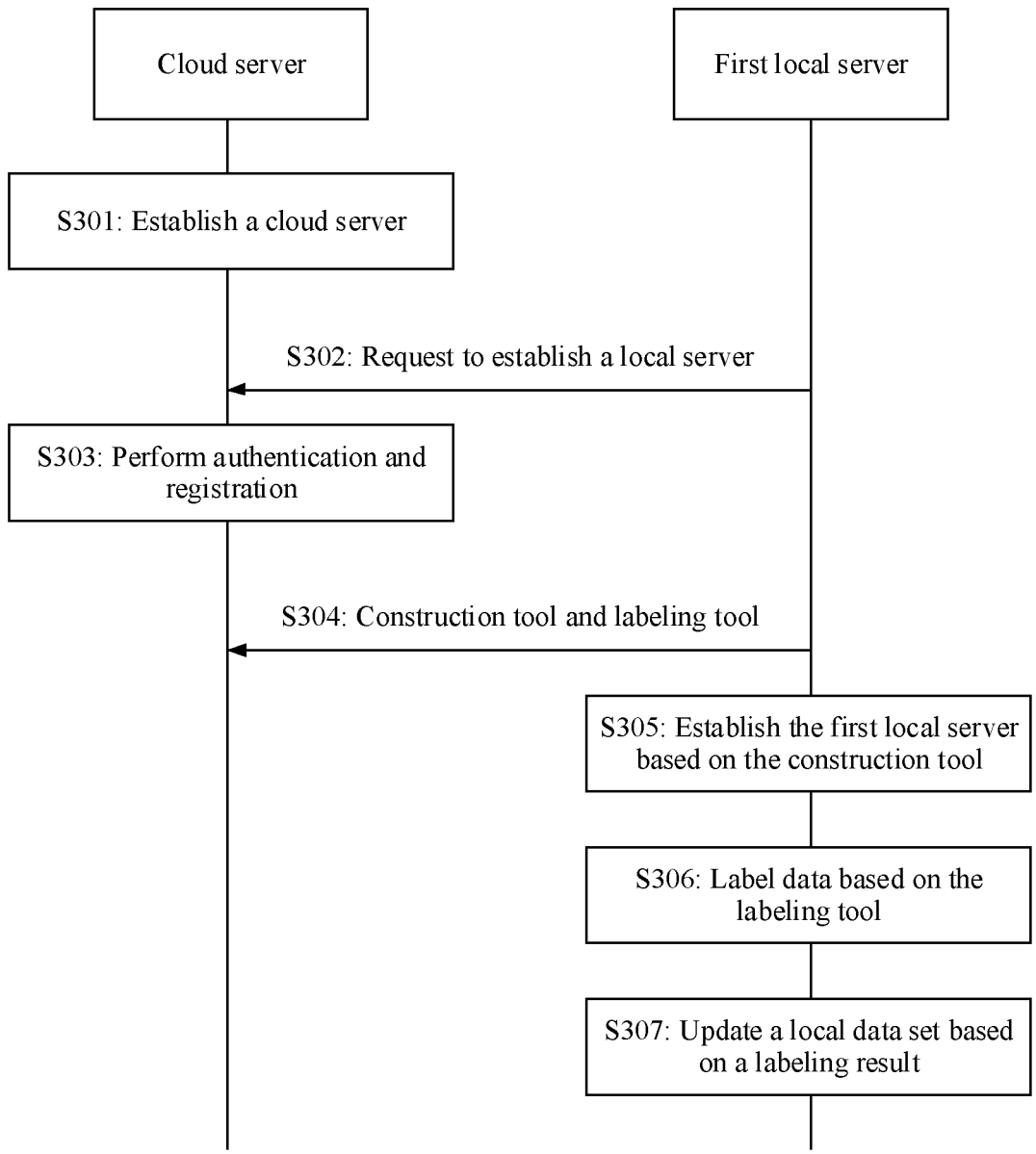
FIG. 8 is a schematic flowchart of an embodiment of a model processing method for a cloud service system according to this application.

Optionally, to implement the cloud service system provided in embodiments of this application, before the foregoing method is implemented, the provider may further establish the entire cloud service system. FIG. 8 is a schematic flowchart of an embodiment of a model processing method for a cloud service system according to this application. The embodiment shown in FIG. 8 shows a procedure for establishing the cloud service system shown in FIG. 3.

S301: A cloud server first establishes a function on one side of the cloud server. For example, in a specific implementation, the cloud server may deploy a federated learning server.

S302: A first local server sends request information to the cloud server, to request to establish the first local server.

S303: The cloud server performs authentication and registration for the first local server based on the request information.

S304: After the authentication and registration succeed, the cloud server sends a construction tool and a labeling tool to the first local server. The construction tool is used to construct the first local server, and the labeling tool is used to label data in a data set.

S305: The first local server establishes a function on one side of the first local server by using the received construction tool. For example, the first local server may deploy a federated learning client.

S306: After receiving the labeling tool, the first local server may label data, and in S307, update a local data set.

Figure 9:
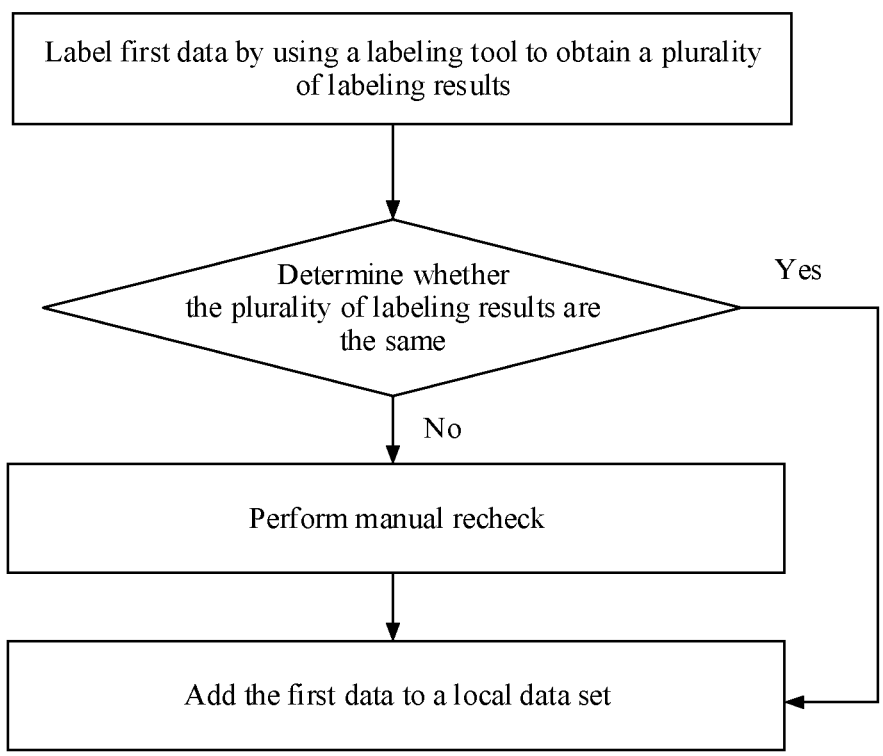
FIG. 9 is a schematic flowchart of data labeling according to an embodiment of this application.

Specifically, for procedures of S306 and S307, refer to an example shown in FIG. 9. FIG. 9 is a schematic flowchart of data labeling according to an embodiment of this application. After receiving a data set sent by at least one connected edge device, the first local server may start to label data in the data set. The data being labeled by the first local server is denoted as first data.

In this way, the first local server can first label the first data by using the labeling tool, to obtain a plurality of labeling results. The labeling tool may be a plurality of pre-trained models, for example, a plurality of models that are obtained by training by the cloud server and that are used for an animal category of a cat or a dog in images. The first data is an image of a cat or a dog, and each pre-trained model may label the first data to obtain a result of a cat or a dog. Subsequently, the first local server may perform determining on results of the plurality of pre-trained models. When a plurality of labeling results of the plurality of models are the same, the first local server adds the first data to a local data set, where the local data set is used when the first local server subsequently updates a first model; or when a plurality of labeling results of the plurality of models are not completely the same, a manual recheck step needs to be performed. The first local server may send the first data to a first device used by a working person, to enable the working person to perform manual labeling on the first data, and then after receiving acknowledgement information sent by the working person by using the first device, the first local server may add the first data to a local data set. In addition, if the working person considers that a sample is abnormal, after receiving abnormal information sent by the working person by using the first device, the first local server may delete the first data without performing subsequent processing.

Optionally, the local data set is stored in the first local server, and another local server cannot access the local data set, and at least one edge device connected to the first local server can access the local data set. Therefore, at least one edge device can implement data sharing by using the first local server, and security of data uploaded to the local server can also be ensured. For example, if all edge devices of a company may be connected to one local server, data processed by all the edge devices in the company may be added to a local data set by using the foregoing procedure. When updating each model, the local server may use the data in the local data set, but other companies cannot obtain the data of the company. In addition, after updating the model, the local server sends only an updated gradient value to the cloud server, and does not send used data to the network, to further ensure data security.

Figure 10:
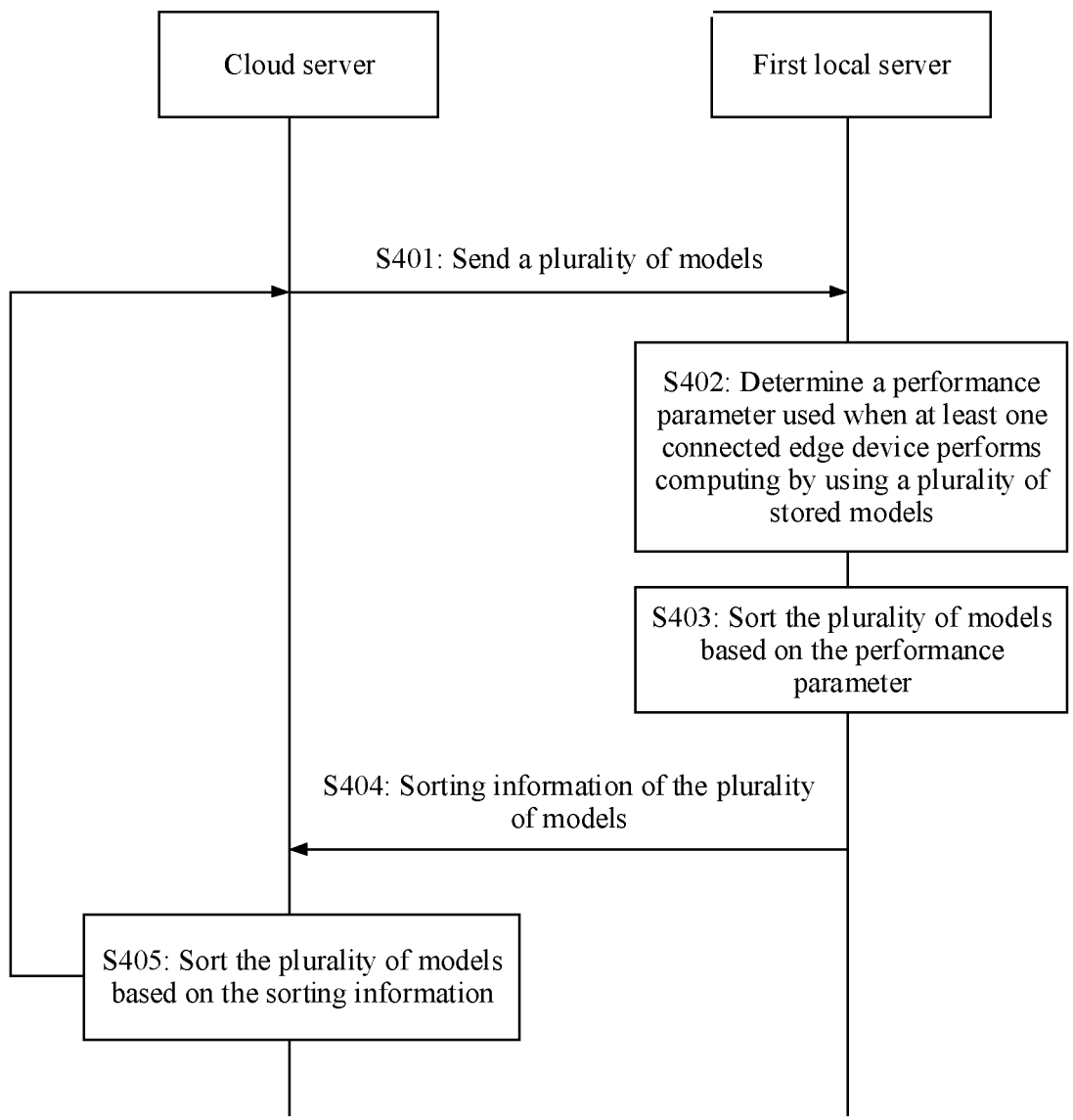
FIG. 10 is a schematic flowchart of an embodiment of a model processing method for a cloud service system according to this application.

Further, in the cloud service system provided in this application, the first local server further has a function of sorting models. Specifically, FIG. 10 is a schematic flowchart of an embodiment of a model processing method for a cloud service system according to this application, and the model processing method may be applied to the cloud service system shown in FIG. 3.

S401: A cloud server sends a plurality of pre-trained models to a first local server. The cloud server may send all the plurality of pre-trained models to the first local server, or the cloud server sends, to the first local server, a plurality of models that need to be used by an edge device connected to the first local server.

S402: The first local server determines a performance parameter used when at least one connected edge device performs computing by using the plurality of models. Optionally, the performance parameter may be computing precision or a computing speed. In S402, the first local server collects statistics on a performance parameter used when all the edge devices use different models. For example, the first local server is connected to edge devices 1 to 5, and learns by statistics collection that an average time for obtaining a result when the edge devices 1 to 3 perform computing by using a model a is 0.1 second, and an average time for obtaining a result when the edge devices 2 to 5 perform computing by using a model b is 0.2 second, and so on.

S403: The first local server sorts the plurality of models based on the performance parameter of the plurality of models that is determined in S401. For example, if the first local server learns by computing that a time for computing by the connected edge device by using the model a is 0.1 second, a time for computing by the connected edge device by using the model b is 0.2 second, and so on, the first local server may sort the plurality of models in descending order of computing speeds, for example, a, b, . . . .

S404: The first local server sends sorting information of the plurality of models that is determined in S403 to the cloud server.

S405: The cloud server sorts the plurality of models based on the sorting information. Finally, the cloud server may sort, based on sorting information sent by all connected local servers, all the models provided by the cloud server. In addition, after the sorting, some models ranked behind may be deleted and replaced with some other models. Afterwards, the cloud server may repeat step S401, and send a plurality of updated models to the local server. In this case, because the plurality of models are sorted in order, assuming that an edge device needs two models that recognize an animal category in images, the cloud server may send, to a local server, two updated models that are ranked ahead and used to recognize the animal category in images, so that the local server sends the updated models to the edge device. This ensures that the edge device uses models ranked ahead, that is, models with more optimal computing performance.

In conclusion, according to the model update method for a cloud service system provided in this embodiment, the local server may sort the performance parameters of the models used by the connected edge devices, and send the sorting information to the cloud server. Composition of the models provided by the cloud server can be continuously optimized after the cloud server sorts the plurality of models, to implement "survival of the fittest" for the models, and improve performance of an edge device when the edge device subsequently uses a model for computing, thereby further improving operating efficiency of the entire cloud service system.

Figure 11:
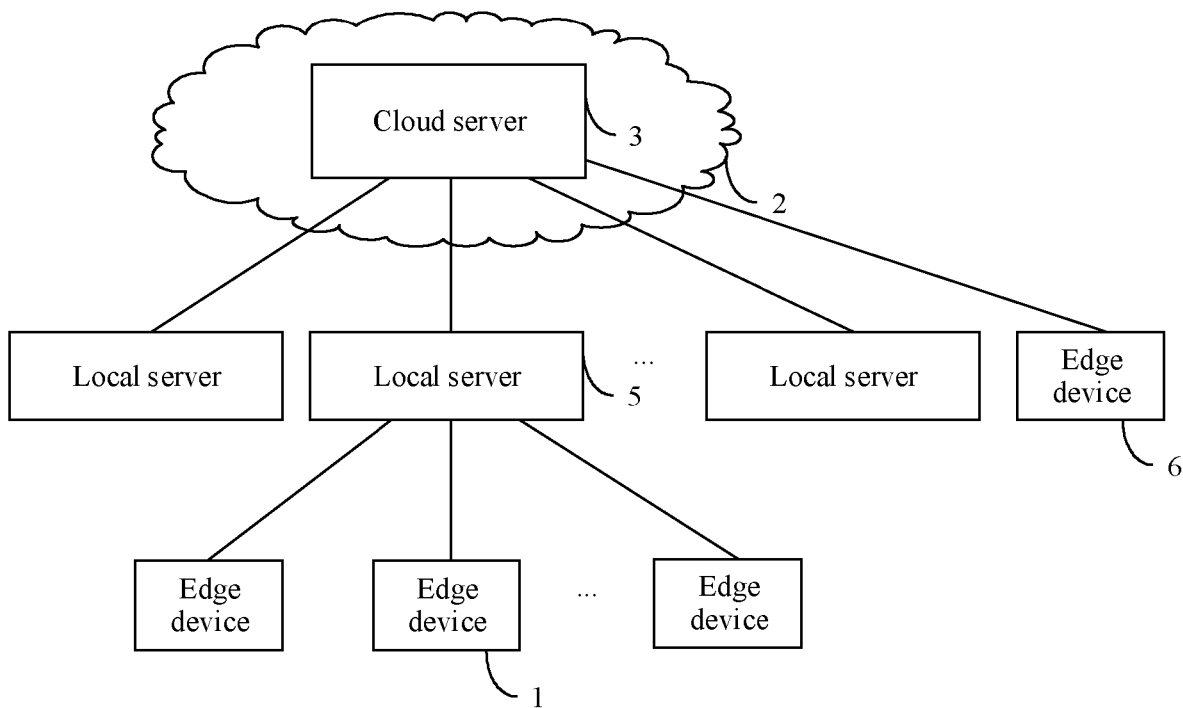
FIG. 11 is a schematic diagram of a structure of another cloud service system according to this application.

Optionally, in the cloud service system shown in FIG. 3, an example in which the cloud server is connected to a plurality of local servers is used. In a specific implementation, the cloud server may also be directly connected to an edge device, to implement hybrid deployment. For example, FIG. 11 is a schematic diagram of a structure of another cloud service system according to this application. On the basis of the embodiment shown in FIG. 3, the cloud server 3 may further be directly connected to the edge device 1. Using an edge device numbered 6 in the figure as an example, the local server 5 may perform processing such as model update in the foregoing embodiment of this application in collaboration with the cloud server 3, and the edge device 6 directly connected to the cloud server 3 may not participate in the model update. However, after updating a model, the cloud server 3 not only sends the updated model to the local server 5 for the local server 5 to send the updated model to the connected edge device 1, but also sends the updated model to the directly connected edge device 6. Therefore, the cloud service system provided in this embodiment has high deployment flexibility, and can reduce a quantity of local servers in the cloud service system to some extent.

In the foregoing embodiments, the cloud service system and the model processing method for a cloud service system provided in embodiments of this application are described. To implement functions in the model processing method for a cloud service system provided in the foregoing embodiments of this application, the cloud server and the first local server serving as execution bodies each may include a hardware structure and/or a software module, and implement the foregoing functions in a form of a hardware structure, a software module, or a combination of a hardware structure and a software module. Whether one of the foregoing functions is performed by a hardware structure, a software module, or a hardware structure and a software module depends on a specific application and design constraints of the technical solutions.

Figure 12:
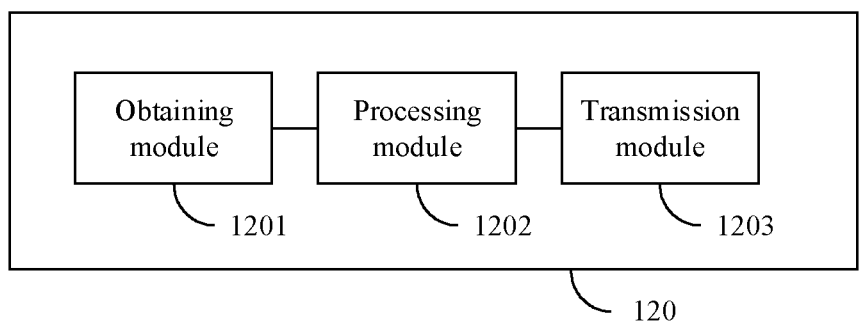
FIG. 12 is a schematic diagram of a structure of an embodiment of a model processing apparatus for a cloud service system according to this application.

For example, FIG. 12 is a schematic diagram of a structure of an embodiment of a model processing apparatus for a cloud service system according to this application. The apparatus shown in FIG. 12 may be used as the first local server in the foregoing embodiments of this application, and perform the method performed by the first local server. The apparatus 120 shown in FIG. 12 includes an obtaining module 1201, a processing module 1202, and a transmission module 1203. The obtaining module 1201 is configured to obtain a data set of at least one edge device, where the data set includes data used when the at least one edge device performs computing by using a first model provided by a cloud server. The processing module 1202 is configured to determine, based on the data set of the at least one edge device, a first gradient value used to update the first model. The transmission module 1203 is configured to send the first gradient value to the cloud server.

Optionally, the transmission module 1203 is further configured to: receive a plurality of models sent by the cloud server, and store the plurality of models into a storage module. The processing module 1202 is further configured to determine at least one model corresponding to a first edge device in the at least one edge device. The transmission module 1203 is further configured to send the at least one model to the first edge device.

Optionally, the transmission module 1203 is further configured to receive a construction tool and a labeling tool that are sent by the cloud server. The construction tool is used to construct the first local server, and the labeling tool is used to label data in the data set.

Optionally, the processing module 1202 is further configured to: label first data in the data set of the at least one edge device by using the labeling tool, to obtain a plurality of labeling results; and when the plurality of labeling results are the same, the first local server adds the first data to a local data set, where the local data set is used to determine the first gradient value used to update the first model. The transmission module 1203 is further configured to: when the plurality of labeling results are not completely the same, send the first data to a first device, and add the first data to a local data set after receiving acknowledgment information sent by the first device.

Optionally, the processing module 1202 is further configured to: a determine performance parameter used when the at least one connected edge device performs computing by using the plurality of models stored in the first local server, and sort the plurality of models based on the performance parameter. The transmission module is further configured to send sorting information of the plurality of models to the cloud server.

For a specific working manner and principle of the model processing apparatus for a cloud service system shown in FIG. 12, refer to the description of the first local server in the foregoing method in this application. Details are not described herein again.

Figure 13:
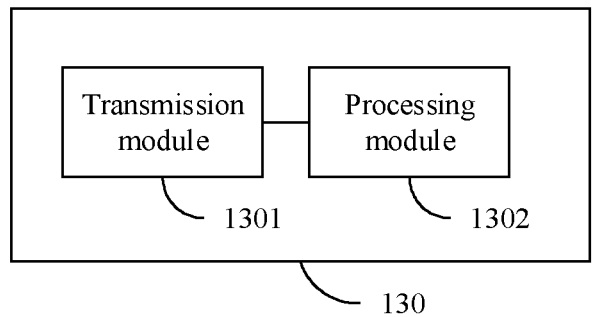
FIG. 13 is a schematic diagram of a structure of an embodiment of a model processing apparatus for a cloud service system according to this application.

FIG. 13 is a schematic diagram of a structure of an embodiment of a model processing apparatus for a cloud service system according to this application. The apparatus shown in FIG. 13 may be used as the cloud server in the foregoing embodiments of this application, and perform the method performed by the cloud server. The apparatus 130 shown in FIG. 13 includes a transmission module 1301 and a processing module 1302. The transmission module 1301 is configured to receive a first gradient value sent by a first local server, where the first gradient value is used to update a first model provided by the cloud server. The processing module 1302 is configured to update the first model based on the first gradient value. The transmission module is further configured to send the updated first model to the first local server.

Optionally, the processing module 1302 is specifically configured to update the first model based on the first gradient value and a gradient value that is sent by at least one second local server in the plurality of local servers.

Optionally, the transmission module 1301 is further configured to send a construction tool and a labeling tool to the first local server. The construction tool is used to construct the first local server, and the labeling tool is used to label data in a data set.

Optionally, the transmission module 1301 is further configured to receive sorting information of a plurality of models that is sent by the first local server. The processing module is further configured to sort the plurality of models based on the sorting information of the plurality of models.

For a specific working manner and principle of the model processing apparatus for a cloud service system shown in FIG. 13, refer to the description of the cloud server in the foregoing method in this application. Details are not described herein again.

It should be noted that, it should be understood that division of the modules of the foregoing apparatus is merely division of logical functions, and in actual implementation, all or some modules may be integrated into one physical entity, or may be physically separated. In addition, all of these modules may be implemented in a form of invoking software by a processor element, or all of these modules may be implemented in a form of hardware, or some modules are implemented in a form of invoking software by a processor element, and some modules are implemented in a form of hardware. For example, the processing module may be a separately disposed processor element, or may be integrated into a chip of the foregoing apparatus for implementation. In addition, the processing module may alternatively be stored in a memory of the foregoing apparatus in a form of program code, and a processor element of the foregoing apparatus invokes and executes a function of the foregoing determining module. Implementation of other modules is similar to that of the processing module. In addition, all or some of these modules may be integrated together, or may be implemented separately. The processor element described herein may be an integrated circuit and has a signal processing capability. In an implementation process, steps in the foregoing methods or the foregoing modules can be implemented by using a hardware integrated logical circuit in the processor element, or by using instructions in a form of software.

For example, the foregoing modules may be one or more integrated circuits configured to implement the foregoing method, for example, one or more application-specific integrated circuits (ASIC), or one or more microprocessors (DSP), or one or more field programmable gate arrays (FPGA), or the like. In another example, when one of the foregoing modules is implemented in a form of invoking program code by a processor element, the processor element may be a general-purpose processor, for example, a central processing unit (CPU) or another processor that can invoke the program code. For another example, the modules may be integrated together and implemented in a form of a system-on-a-chip (SOC).

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Figure 14:
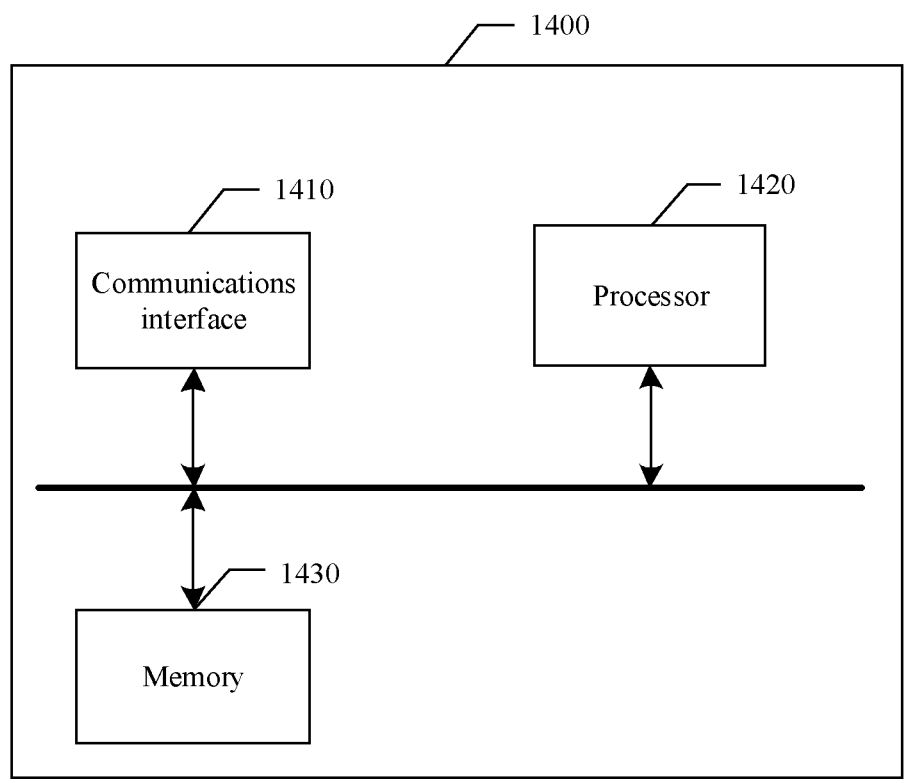
FIG. 14 is a schematic diagram of a structure of a computing apparatus according to this application.

In addition, an embodiment of this application further provides another structure of a computing apparatus that can be used to implement a first local server or a cloud server provided in this application. FIG. 14 is a schematic diagram of a structure of a computing apparatus according to this application. As shown in FIG. 14, the computing apparatus 1400 may include a communications interface 1410 and a processor 1420. Optionally, the computing apparatus 1400 may further include a memory 1430. The memory 1430 may be disposed inside the computing apparatus, or may be disposed outside the computing apparatus.

For example, actions performed by the first local server in FIG. 4 to FIG. 10 may all be implemented by the processor 1420. The processor 1420 sends data by using the communications interface 1410, and is configured to implement any method performed by the first local server in FIG. 4 to FIG. 10. In an implementation process, each step of the processing procedure may be implemented by using an integrated logical circuit of hardware in the processor 1420 or an instruction in a form of software, to implement the method performed by the first local server in FIG. 4 to FIG. 10. For brevity, details are not described herein again. Program code executed by the processor 1420 to implement the foregoing method may be stored in the memory 1430. The memory 1430 is connected to the processor 1420, for example, by coupling.

In another example, actions performed by each cloud server in FIG. 4 to FIG. 10 may all be implemented by the processor 1420. The processor 1420 sends a control signal and communication data by using the communications interface 1410, and is configured to implement any method performed by the cloud server in FIG. 4 to FIG. 10. In an implementation process, each step of the processing procedure may be implemented by using an integrated logical circuit of hardware in the processor 1420 or an instruction in a form of software, to implement the method performed by the cloud server in FIG. 4 to FIG. 10. For brevity, details are not described herein again. Program code executed by the processor 1420 to implement the foregoing method may be stored in the memory 1430. The memory 1430 is connected to the processor 1420, for example, by coupling.

Some features in this embodiment of this application may be implemented/supported by the processor 1420 by executing program instructions or software code in the memory 1430. Software components loaded on the memory 1430 may be summarized from a functional or logical perspective, for example, the obtaining module 1201, the processing module 1202, and the transmission module 1203 shown in FIG. 12; and in another example, the transmission module 1301 and the processing module 1302 shown in FIG. 13.

Any communications interface in this embodiment of this application may be a circuit, a bus, a transceiver, or any other apparatus that may be configured to perform information exchange, for example, the communications interface 1410 in the computing apparatus 1400. For example, the another apparatus may be a device connected to the computing apparatus. For example, when the computing apparatus is a first local server, the another apparatus may be a cloud server. When the computing apparatus is a cloud server, the another apparatus may be a first local server.

In embodiments of this application, the processor may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by a combination of hardware and software modules in the processor.

The coupling in embodiments of this application is indirect coupling or a communication connection between apparatuses or modules for information exchange between the apparatuses or the modules, and may be in electrical, mechanical, or other forms.

The processor may perform an operation in collaboration with the memory. The memory may be a non-volatile memory, for example, a hard disk drive (HDD) or a solid-state drive (SSD), or may be a volatile memory, such as a random-access memory (RAM). The memory is any other medium that can carry or store expected program code in a form of an instruction structure or a data structure and that can be accessed by a computer, but is not limited thereto.

A specific connection medium between the communications interface, the processor, and the memory is not limited in this embodiment of this application. For example, the memory, the processor, and the communications interface may be connected by using a bus. The bus may be classified into an address bus, a data bus, a control bus, and the like. Certainly, a connection bus between the processor and the memory is not a connection bus between the cloud server and the first local server.

In embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates that associated objects are in an "or" relationship. In a formula, the character "/" indicates that the associated objects are in a "division" relationship. "At least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

It may be understood that various numbers in embodiments of this application are merely used for differentiation for ease of description, and are not used to limit the scope of embodiments of this application. It may be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A cloud service system comprising:
   a cloud server for training and distributing machine learning models; and
   a plurality of local servers for training and distributing machine learning models, wherein a first local server in the plurality of local servers is connected to the cloud server through a network and further connected to multiple edge devices including a first edge device having a first machine learning model deployed thereon;
   wherein the first local server is configured to:
      obtain a data set of the first edge device, the data set comprising data used when the first edge device performs computing by using the first machine learning model provided by the cloud server;
      determine, based on the data set of the first edge device, a first gradient value used to update the first machine learning model, wherein the first gradient value is a difference between a current value of a parameter of the first machine learning model as deployed on the first edge device and a previous value of the parameter of the first machine learning model as provided by the cloud server; and
      send the first gradient value to the cloud server;
   wherein the cloud server is configured to:
      update the first machine learning model based on the first gradient value received from the first local server; and
      send the updated first machine learning model to the first local server;
      send a construction tool and a labeling tool to the first local server, wherein the construction tool is for constructing the first local server, and the labeling tool is for labeling data in the data set, and
   wherein the first local server is configured to:
      determine a performance parameter used when the connected edge devices perform computing by using the plurality of machine learning models stored in the first local server;

sort the plurality of machine learning models based on the performance parameter; and send sorting information of the plurality of machine learning models to the cloud server, and wherein the cloud server is configured to:

sort the plurality of machine learning models based on the sorting information of the plurality of machine learning models.

2. The system according to claim 1, wherein the cloud server is further configured to:

send a plurality of machine learning models to the first local server, and wherein the first local server is further configured to:

receive and store the plurality of machine learning models sent by the cloud server;

determine the first machine learning model corresponding to the first edge device; and send the first machine learning model to the first edge device.

3. The system according to claim 1, wherein the cloud server is configured to update the first machine learning model based on the first gradient value and a gradient value sent by a second local server in the plurality of local servers.

4. A method for training and distributing machine learning models performed in a cloud service system comprising a cloud server and a plurality of local servers, wherein a first local server in the plurality of local servers is connected to the cloud server through a network and further connected to multiple edge devices including a first edge device, the method comprising:

obtaining, by the first local server, a data set of the edge devices, wherein the data set comprises data used when the edge devices perform computing by using a first machine learning model provided by the cloud server;

determining, by the first local server based on the data set of the first edge device, a first gradient value used to update the first machine learning model, wherein the first gradient value is a difference between a current value of a parameter of the first machine learning model as deployed on the first edge device and a previous value of the parameter of the first machine learning model as provided by the cloud server;

sending, by the first local server, the first gradient value to the cloud server;

sending, by the cloud server, a construction tool and a labeling tool to the first local server, wherein the construction tool is for constructing the first local server, and the labeling tool is for labeling data in the data set;

determining, by the first local server, a performance parameter used when the connected edge devices perform computing by using the plurality of machine learning models stored in the first local server;

sorting, by the first local server, the plurality of machine learning models based on the performance parameter; and sending, by the first local server, sorting information of the plurality of machine learning models to the cloud server; and sorting, by the cloud server, the plurality of machine learning models based on the sorting information of the plurality of machine learning models.

5. The method according to claim 4, wherein before the step of obtaining the data set of the edge device, the method further comprises:

receiving, by the first local server, a plurality of machine learning models sent by the cloud server;

determining, by the first local server, the first machine learning model corresponding to the first edge device in the multiple edge devices connected to the first local server; and sending, by the first local server, the first machine learning model to the first edge device.

6. The method according to claim 4, wherein after the step of obtaining the data set of the edge devices, the method further comprises:

labeling, by the first local server using the labeling tool, first data in the data set of the edge devices to obtain a plurality of labeling results; and when the plurality of labeling results are identical, adding, by the first local server, the first data to a local data set, wherein the local data set is used to determine the first gradient value used to update the first machine learning model; or when the plurality of labeling results are not completely identical, sending, by the first local server, the first data to a first device, and adding the first data to the local data set after receiving acknowledgment information sent by the first device.

7. The method according to claim 6, further comprising:

determining, by the first local server, a performance parameter used when the connected edge devices perform computing by using the plurality of machine learning models stored in the first local server;

sorting the plurality of machine learning models based on the performance parameter; and sending, by the first local server, sorting information of the plurality of machine learning models to the cloud server.

8. A method for training and distributing machining learning models performed in a cloud service system comprising a cloud server and a plurality of local servers, wherein a first local server in the plurality of local servers is connected to the cloud server through a network and further connected to multiple edge devices, the method comprising:

receiving, by the cloud server, a first gradient value sent by the first local server, wherein the first gradient value is for updating a first machine learning model provided by the cloud server and deployed on a first edge device, wherein the first gradient value is a difference between a current value of a parameter of the first machine learning model as deployed on the first edge device and a previous value of the parameter of the first machine learning model as provided by the cloud server;

updating, by the cloud server, the first machine learning model based on the first gradient value received from the first local server;

sending, by the cloud server, the updated first machine learning model to the first local server for deploying on the first edge server;

sending, by the cloud server, a construction tool and a labeling tool to the first local server, wherein the construction tool is for constructing the first local server, and the labeling tool is for labeling data in the data set;

determining, by the first local server, a performance parameter used when the connected edge devices perform computing by using the plurality of machine learning models stored in the first local server;

sorting, by the first local server, the plurality of machine learning models based on the performance parameter; and sending, by the first local server, sorting information of the plurality of machine learning models to the cloud server; and sorting, by the cloud server, the plurality of machine learning models based on the sorting information of the plurality of machine learning models.

9. The method according to claim 8, wherein the step of updating the first machine learning model based on the first gradient value comprises:

updating, by the cloud server, the first machine learning model based on the first gradient value and a second gradient value sent by a second local server in the plurality of local servers.

10. The method according to claim 8, further comprising:

receiving, by the cloud server, sorting information of a plurality of machine learning models sent by the first local server; and sorting, by the cloud server, the plurality of machine learning models based on the sorting information of the plurality of machine learning models.

* * * * *